United States Patent Office 3,418,330
Patented Dec. 24, 1968

3,418,330
NOVEL PYRIDYL SUBSTITUTED OXETANES AND DERIVATIVES THEREOF
Donald R. Arnold, Lincolndale, N.Y., and Anthony A. Sousa, Raleigh, N.C., assignor to Union Carbide Corporation, a corporation of New York
No Drawing. Continuation-in-part of application Ser. No. 324,183, Nov. 18, 1963. This application Mar. 23, 1966, Ser. No. 536,645
13 Claims. (Cl. 260—297)

ABSTRACT OF THE DISCLOSURE

Novel oxetanes such as 2-pyridyl-2-phenyl-3,3-dimethyl oxetane are prepared by the photocatalyzed reaction of a ketone with an olefinic compound.

Specification

The present invention is directed to novel heterocyclic organic compounds and to a process for their preparation. In one aspect, this invention is directed to novel oxetanes. In a further aspect, this invention relates to certain novel oxetanes which are useful in fungicidal applications, particularly, as mildewcides.

This application is a continuation-in-part of U.S. patent application Ser. No. 324,183, entitled "Novel Oxetanes and Use Thereof," filed Nov. 18, 1963, by D. R. Arnold and A. A. Sousa, now abandoned.

Heretofore, a wide variety of synthetic methods have been reported in the literature for the preparation of oxetanes. However, most of these methods are not very general and frequently require starting materials which are exceedingly difficult to prepare. Moreover, the reported synthetic methods rarely give high yields and hence are undesirable for large scale commercial production.

It has recently been discovered that a wide variety of novel oxetanes can be conveniently prepared by the photocycloaddition of carbonyl compounds to olefins. In many instances, the yields of the desired oxetanes are high, sometimes nearly quantitative. Moreover, the starting materials are readily available and hence oxetanes can readily be obtained which were difficult or impossible to prepare by classical methods.

Accordingly, one or more of the following objects will be achieved by the practice of the instant invention. It is an object of this invention to provide a class of novel oxetanes. Another object of this invention is to provide a class of novel oxetanes which are characterized by the presence of a heterocyclic group attached to one of the ring carbon atoms. A further object is to provide novel 2 - pyridyl-2-phenyl-3,3-dihydrocarbyloxetanes. Another object is to provide certain novel oxetanes which are useful in agricultural and biological applications. A still further object of this invention is to provide certain novel oxetanes which are useful as mildewcides. Another object is to provide a process for the prepartion of novel oxetanes. These and other objects will readily become apparent to those skilled in the art in the light of the teachings herein set forth.

The novel oxetanes of this invention can be represented by the structural formula:

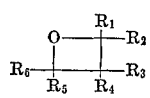

wherein $R_1$, $R_2$, $R_3$ and $R_4$ individually represent hydrogen, hydrocarbyl, halohydrocarbyl, aminohydrocarbyl, alkoxyhydrocarbyl, aminoalkoxyhydrocarbyl, or heterocycl groups; and $R_5$ and $R_6$ individually represent hydrocarbyl, halohydrocarbyl, aminohydrocarbyl, alkoxyhydrocarbyl, aminoalkoxyhydrocarbyl, cyanohydrocarbyl, carbamyl, N-alkylcarbamyl, N-cycloalkylcarbamyl, N-heterocyclcarbamyl, or heterocycl groups; with the provisos that: (1) one pair of $R_1$ and $R_2$, $R_3$ and $R_4$, or $R_5$ and $R_6$ can together with the carbon atom to which they are attached represent the groups:

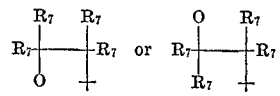

wherein $R_7$ represents hydrogen, halogen, a hydrocarbyl group, a hydroxyhydrocarbyl group, or two $R_7$'s on the same carbon atom can together form an alkylene group, i.e.,

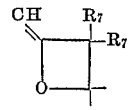

(2) $R_5$ and $R_6$ can together with the carbon atom to which they are attached represent the group:

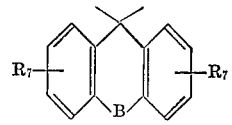

wherein $R_7$ has the same value as above; B represents a sulfonyl group, i.e.,

a lower alkylene group of from 1 to 2 carbon atoms, or an alkyl-substituted lower alkylene group of from 2 to 10 carbon atoms, (3) $R_2$ and $R_3$ can together with the carbon atom to which they are attached represent the group:

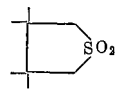

and (4) at least one of $R_1$-$R_6$ represents a group other than hydrogen, hydrocarbyl, or haloaryl.

Preferred novel oxetanes encompassed by the aforementioned formula are those wherein $R_1$, $R_2$, $R_3$ and $R_4$ individually represent hydrogen, alkyl, alkenyl, aryl, alkaryl, aralkyl, cycloalkyl, cycloalkenyl, bicycloalkyl, bicycloalkenyl, haloalkyl, haloaryl, halocycloalkyl, alkoxyalkyl, alkoxyaryl, aminoalkyl, aminoaryl, alkylaminoalkyl, dialkylaminoalkyl, and the like, provided that no more than two of said $R_1$-$R_4$ variables are hydrogen; $R_5$ and $R_6$ individually represent alkyl, alkenyl, aryl, alkaryl, aralkyl, cycloalkyl, bicycloalkyl, haloalkyl, haloaryl, haloalkaryl, halocarbonyl, alkoxyaryl, aminoalkyl, aminoaryl, alkylaminoalkyl, dialkylaminoalkyl, dialkylaminoalkoxyalkyl, pyridyl (ortho, meta, and para), alkylpyridyl, piperidyl, piperidylalkyl, alkylpiperidyl, piperidinoalkyl, pyrimdyl, alkylpyrimidyl, pyrimidinylalkyl, pyrazolyl, pyrazyl, pyrazylalkyl, N-alkoxycarbonylpiperazinylalkyl, piperizinyl, N-alkylpiperazinylalkyl, morpholinyl, alkylmorpholmyl, 1, 2,5,6-tetrahydropyridyl, N-alkyl-1,2,5,6-tetrahydropyridyl, N-aryl-1,2,5,6-tetrahydropyridyl, N-aralkyl-1,2,5,6-tetrahydropyridyl, carbamyl, alkylcarbamyl, cycloalkylcarbamyl, N-heterocycylocarbamyl and the like.

Particularly preferred oxetanes of this invention are those wherein each of the $R_1$-$R_7$ variables contains up to 18 carbon atoms, and wherein at least one of the $R_5$ and $R_6$ variables is a heterocyclic group composed of carbon, hydrogen, and from 1 to 2 ring nitrogen and/or oxygen atoms.

Illustrative novel oxetanes encompassed by the aforementioned formula include, among others, the 2-heterocycl-2,3,3-trihydrocarbyloxetanes, e.g.,
2-(ortho-pyridyl)-2-phenyl-3,3-dimethyloxetane,
2-(meta-pyridyl)-2-phenyl-3,3-dimethyloxetane,
2-(para-pyridyl)-2-phenyl-3,3-dimethyloxetane,
2-(meta-pyridyl)-2,3,3-trimethyloxetane,
2-(ortho-pyridyl)-2,3,3-trimethyloxetane,
2-(para-pyridyl)-2,3,3-trimethyloxetane,
2-(para-pyridyl)-2-phenyl-3,3,4,4-tetramethyloxetane,
and the like.

The novel oxetanes of this invention can be produced by the photocatalyzed reaction of a ketone with an olefinic compound. The reaction producing the novel oxetanes of this invention is carried out by bringing the ketone and the olefinic compound into admixture in a suitable reactor and irradiating the mixture with light energy of catalytic wavelength, typically in the range of from about 2,000 to about 4,000 angstroms. The use of light energy of shorter wavelengths substantially below 2,000 angstroms may engender the photolytic decomposition of the reactants and/or the oxetane product and is therefore to be avoided, while little if any of the desired reaction occurs using light energy of longer wavelengths substantially above 4,000 angstroms. Thus, the term "light energy," as employed herein, contemplates wavelengths predominantly in the ultra-violet spectrum. Convenient sources of such light energy include, for instance, tungsten bulbs, daylight, mercury vapor and xenon arc lamps, etc.

The reaction of the ketone with the olefinic compound can be carried out in solution using an inert, normally liquid solvent such as a saturated aliphatic or aromatic hydrocarbon or halogen derivative thereof, as for instance, heptane, hexane, pentane, benzene, acetic acid, acetonitrile, carbon tetrachloride, and the like, especially those having a boiling point below about 100° C. The use of such a solvent is preferred. The reaction can, however, also be carried out "neat," i.e., in the absence of external solvent.

The proportion in which the reactants are utilized can vary broadly, and does not limit the invention. Typically, the reactants are employed in a proportion of from about 0.1 mole to about 10 moles of the ketone per mole of the olefinic compound. Higher or lower proportions of reactants can also be employed satisfactorily. However, the efficient utilization of the reactants will generally decrease when greater than stoichiometric, i.e., equimolar, proportions are employed.

The reaction temperature can also very broadly typically in the range of from about 0° C. to about 100° C., and preferably in the range of from about 10° C. to about 30° C. Here again, higher or lower reaction temperatures may also be employed satisfactorily. In any given instance, however, the temperature should not be so high as to engender the decomposition of the relatively heat-sensitive oxetane product, and is dependent to a large extent upon the identity of any external solvent employed. Thus, the temperature should not be so high as to volatilize the solvent, nor so low as to preclude its normally liquid form. Preferably, the temperature should also be consistent with the dissolution of any gaseous reactant in the solvent, i.e., should not volatilize the reactant from the solvent.

When within the above temperature range, the reaction is generally carried out, i.e., irradiation continued, for a period of from several hours to several days depending upon the concentration of reactants present, the wavelength and intensity of the light energy employed, etc. Longer or shorter reaction periods sufficient to produce the desired oxetane can also be utilized. Preferably, a stoichiometric amount or excess of the olefinic compound is admixed with the ketone and the reaction is carried out to completion as determined by periodically removing aliquots from the reaction mixture and subjecting the aliquots to infra-red analysis. Under such circumstances the completion of the reaction is indicated by the disappearance of the carbonyl peak in the infra-red spectrum, carbonyl absorption occurring at a wavelength of approximately 6 microns.

Any suitable vessel which will permit the transmission of light energy of the desired wavelength, as described above, can be employed as a reactor. Typically, Pyrex or quartz vessels are employed in this regard, Pyrex being preferred interposed between the reaction mixture and the source of light energy.

Upon completion of the reaction, the oxetane product can be recovered in any convenient manner. For instance, the product can be recovered as the residue obtained upon the evaporation or distillation of any unreacted material and/or solvent present. The product can thereafter be purified, if desired, by extraction or recrystallization, etc.

The apparatus employed in each of the examples consisted of a quartz well (Hanovia No. 19434) with a Pyrex filter immersed in a Pyrex reaction vessel having a capacity of 200 milliliters. The reaction vessel was equipped at the bottom with a glass fitted gas inlet for the introduction of purge gas and gaseous reaction, and the top with two outlets, one protected by a mercury bubbler and the other covered by a rubber septum through which periodic withdrawal of aliquots of the reaction mixture could be made. The light source was a 450 watt (Hanovia No. 679A–36) mercury arc lamp. The apparatus was maintained at a temperature in the range of 5–10° C. by immersing it in a refrigerated bath and circulating cooling water through the well.

Unless indicated otherwise, all of the oxetane products described herein were prepared by essentially the same procedure using the appropriate ketone and olefinic compound as reactants. The elemental analysis results are also indicated in Table A for each example. The oxetane structure of the products was confirmed in each instance by infra-red analysis, oxetane absorption occurring at a wavelength of 10±0.3 microns, and nuclear magnetic resonance.

Experimental procedure

A solution of 18.2 grams (0.1 mole) of benzophenone in 150 milliliters of benzene in the apparatus described above was purged with nitrogen after which isobutylene was introduced until the volume of the reaction mixture was 200 milliters. The light source was turned on for a period of 24 hours. The excess isobutylene and the solvent was evaporated under reduced pressure leaving a colorless crystalline material (22.1 grams, melting point 80–85° C.) showing strong oxetane and no carbonyl absorption in the infra-red spectrum. The nuclear magnetic resonance spectrum of this material was consistent with 3,3-dimethyl-2,2-diphenyloxetane. Further purification was affected by chromatography on alumina eluting with n-hexane. The oxetane came off in the first fractions. Recrystallization from ethanol afforded pure 3,3-dimethyl-2,2-diphenyloxetane having a melting point of 88.5–90° C. In a similar manner, the carbonyl compounds and olefins set forth in Table A were reacted to give the desired oxetanes.

The photocycloaddition of carbonyl compounds with the allenes was effected as follows:

A solution of 18.22 grams (0.10 mole) of benzophenone and 11.54 grams (0.12 mole) of tetramethylallene in 170 milliliters of benzene was irradiated with a 450 watt mercury lamp in the same apparatus previously employed. The mixture was purged with nitrogen throughout the irradiation period. After twenty-four hours the solvent was removed on a rotary evaporation leaving a yellow oil which showed strong infra-red absorption at 10μ due to the oxetane and no detectable carbonyl absorption. The yellow oil was chromatographed on an alumina column eluting with n-hexane-benzene mixture to give the pure products listed as Examples 13, 14, and 15.

In those instances wherein the reaction of the carbonyl compounds and olefins resulted in a mixture of isomeric products, separation was effected according to known techniques to provide the pure isomers.

It should also be noted that a wide variety of derivatives can be prepared from various oxetanes of this invention. For example, the oxetane of Example 16 can serve as the starting material for the preparation of acids, amines, and similar products.

TABLE A

| Ex. | Carbonyl Compound | Olefin | Oxetane | Yield in Percent | Elemental Analysis in Percent | |
|-----|-------------------|--------|---------|------------------|-------------------------------|---|
| | | | | | Calculated | Found |
| 1 | Ortho-benzoylpyridine | Isobutylene | 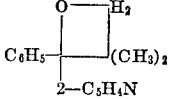 | 57 | C: 80.30<br>H: 7.16<br>N: 5.85 | C: 80.11<br>H: 7.09<br>N: 5.83 |
| 2 | Meta-benzoylpyridine | do | 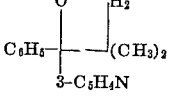 | 48 | C: 80.30<br>H: 7.16<br>N: 5.85 | C: 80.18<br>H: 7.16<br>N: 5.96 |
| 3 | Para-benzoylpyridine | do | 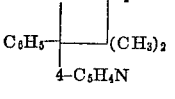 | 56 | C: 80.30<br>H: 7.16<br>N: 5.85 | C: 80.19<br>H: 7.30<br>N: 5.94 |
| 4 | Meta-acetylpyridine | do | 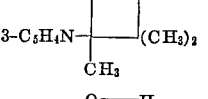 | 25 | | |
| 5 | Para-acetylpyridine | do | 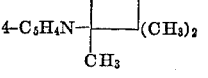 | 56 | C: 74.54<br>H: 8.53 | C: 74.25<br>H: 8.65 |
| 6 | Meta-benzoylpyridine | Tetramethylethylene | 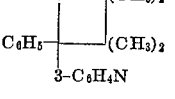 | 28 | C: 80.86<br>H: 7.92 | C: 80.50<br>H: 8.07 |
| 7 | Anthrone | Isobutylene | 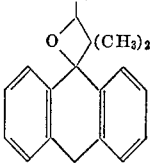 | 55 | C: 86.36<br>H: 7.25 | C: 86.01<br>H: 7.38 |
| 8 | Dibenzsuberone | do | 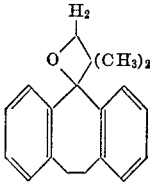 | 96 | C: 86.32<br>H: 7.63 | C: 86.26<br>H: 7.76 |
| 9 | 1,3-dibenzoylbenzene | do | 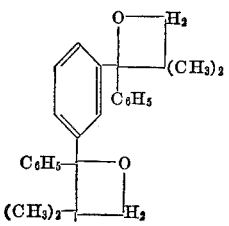 | | | |
| 10 | Benzophenone | Dimethyl allene | 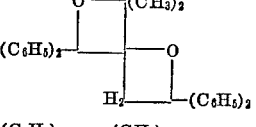 | 16 | | |
| 11 | do | do | 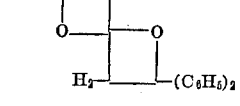 | 39 | | |

TABLE A—Continued

| Ex. | Carbonyl Compound | Olefin | Oxetane | Yield in Percent | Elemental Analysis in Percent | |
|---|---|---|---|---|---|---|
| | | | | | Calculated | Found |
| 12 | do | do | (structure: oxetane with C(CH₃)₂, O, (C₆H₅)₂, H₂) plus (structure with CH₂, O, (C₆H₅)₂, (CH₃)₂) | 2 | | |
| 13 | do | Tetramethylallene | (structure: C(CH₃)₂, O, C₆H₅, (CH₃)₂) | 17 | C: 86.28<br>H: 7.97 | C: 86.49<br>H: 8.14 |
| 14 | do | do | (structure: (C₆H₅)₂, (CH₃)₂, O, (CH₃)₂, (C₆H₂)₂) | 22 | C: 86.05<br>H: 7.00 | C: 86.18<br>H: 7.08 |
| 15 | do | do | (structure: (C₆H₅)₂, (CH₃)₂, O, (CH₃)₂, (C₆H₅)₂) | 43 | C: 86.05<br>H: 7.00 | C: 85.79<br>H: 6.94 |
| 16 | Phenylglyoxylamide | Isobutylene | (structure: O, H₂, C₆H₅, (CH₃)₂, CONH₂) | | | |
| 17 | Ortho-benzoylpyridine | 1-carbethoxy-2,2-dimethyl-3-isobutenyl-cyclopropane. | (structure: O, (CH₃)₂, CO₂et, C₅H₄N, (CH₃)₂, C₆H₅) | | | |
| 18 | Benzophenone | Iso-rene sulfone | (structure: O, SO₂, (C₆H₅)₂, CH₂) | 56 | C: 68.76<br>H: 5.77 | C: 68.58<br>H: 5.92 |
| 19 | Trifluomethylacetophenone | Isobutylene | (structure: O, (CH₃)₂, CF₃, C₆H₅) Plus (structure: O, H₂, CF₃, (CH₃)₂, C₆H₅) | 79 | | |
| 20 | Para-cyanoacetophenone | do | (structure: O, H₂, (4-CN)C₆H₄-, (CH₃)₂, CH₃) | 35 | | |
| 21 | Ortho-trifluoromethylbenzophenone. | do | (structure: O, H₂, C₆H₅, (CH₃)₂, (2-CF₃)C₆H₄) | 72 | C: 70.57<br>H: 5.50 | C: 70.70<br>H: 5.55 |
| 22 | Para-trifluoromethylbenzophenone. | do | (structure: O, H₂, C₆H₅, (CH₃)₂, (4-CF₃)C₆H₄) | 87 | C: 70.57<br>H: 5.60 | C: 70.90<br>H: 5.66 |

The novel oxetanes of this invention may be employed in a variety of fungicidal applications, salient among which is their use as mildewcides. Found to be particularly useful in this regard are the meta-pyridyl substituted oxetanes. The meta-pyridyl substituted oxetanes generally demonstrate a high degree of mildewcidal effectiveness at lower concentrations, or when employed at equal strength demonstrate superior mildewcidal effectiveness, as compared with the other oxetanes contemplated by this invention.

It has also been found that the novel oxetanes of this invention are especially effective against *Erysiphe polygoni*, the causal organism of powdery mildew of bean and *podosphaera leucotricha*, the causal organism of powdery mildew of apples. Significantly, when applied to a mildew susceptible host in a suitable inert carrier, the oxetanes, and particularly the meta-pyridyl substituted oxetanes, demonstrate mildewcidal activity at concentrations as low as 0.1 part per million parts of carrier, or even at somewhat lower concentrations. Moreover, the oxetanes demonstrate good retention of mildewcidal activity for applicable periods of time following their formation.

Typically, the oxetanes are employed as mildewcides in a concentration in the range of from about 4 to about 500 parts per million parts of carrier, although higher or lower mildewcidally effective amounts can also be employed. A preferred range is from about 20 to about 100 parts per million parts of carrier. Any suitable inert liquid or solid carrier such as water, talc, or the like, can be employed in this regard, as can readily be determined by one skilled in the art in light of this disclosure.

The procedure employed in evaluating the novel oxetanes of this invention is as follows:

Biological test procedures

A stock suspension of the oxetane was prepared by dissolving one gram in 50 milliliters of acetone in which had been dissolved 0.1 gram of octylphenoxy polyethoxyethanol as an emulsifying agent. The resulting solution was mixed into 150 milliliters of water to give 200 milliliters of a suspension containing the oxetane in finely divided form. The various test concentrations described in parts per million were prepared by dilution of this stock suspension.

Tender green beans were used as the host plant for the bean mildew, *Erysiphe polygoni*. A culture of this organism was maintained on bean plants in a greenhouse. Twenty-four hours prior to testing, uninfected plants with primary leaves fully expanded were inoculated by brushing their leaves lightly with plants taken from the stock culture.

The bean plants infected with mildew were sprayed on a revolving turntable for 30 seconds at a pressure of 40 p.s.i.g. Approximately 100 milliliters of spray were delivered. For control purpose, an equal volume of a water solution containing acetone emulsifier, and a conventional mildewcide, Karathane [1] in the same concentrations as the stock suspension above was also sprayed on other infected plants.

After the spray had dried, the plants were held in a greenhouse for a period of 7–10 days. At the end of this period, visual observations of mildew control were made according to the following designations:

5 = 100% control, no spots per leaf
4 = 1–3 spots per leaf
3 = 4–10 spots per leaf
2 = Many but distinctly different spots
1 = Leaf overrun with mildew; equal to check plants.

In a similar procedure, MacIntosh apple seedlings were used as the host plant for the apple mildew, *Podosphaera leucotricha*. The seedlings were inoculated twenty-four hours prior to initial spraying with a stock solution prepared as described above. Spraying was carried out as described above at weekly intervals for a period of three weeks. Visual observations of mildew control were made one week following each application in accordance with the designations set forth above. The treated plants were placed among untreated, heavily mildewed apple seedlings during the entire test period except for the time required for spraying.

The effective dose required for a "3" rating in the control of bean mildew was obtained for the oxetanes by plotting log concentration of oxetane versus probit rating and deriving the concentration of oxetane in parts per million parts of water required for 50 percent control of mildew. Thus derived, the $ED_3$ value, for example, for 2-(meta-pyridyl)-2-phenyl-3,3-dimethyloxetane, was found to be 15.

[1] 2,4-dinitro-6-(2-octyl)phenyl crotonate.

In addition to contacting the causative organism, mildew control is also realized by the application of the oxetanes of this invention in similar manner to an uninfected mildew susceptible host. Protection against the onset of mildew is thereby realized for appreciable periods of time during which the oxetanes are active as mildewcides.

Moreover, it has been found from screening tests that the oxetanes of this invention, particularly the meta-pyridyl substituted oxetanes, are effective in other fungicidal applications. By way of illustration, 2-(meta-pyridyl)-2-phenyl-3,3-dimethyloxetane also demonstrated activity as a soil fungicide, *Pythium sp.* being the causative organism in this instance.

In addition to their use as mildewcides, the novel oxetanes of this invention are useful in other areas of application. The oxetanes of this invention are also useful as organic intermediates for the preparation of a wide variety of compounds. For example, in the presence of acids, the novel oxetanes of this invention can be cleaved across the oxetane ring to form olefins. Moreover, these novel oxetanes, as are the known cyclic ethers, are useful as plasticizers. Additionally, the oxetanes can homopolymerize or copolymerize readily with other reactive cyclic monomers to provide a useful class of polymeric compounds. These polymers can range from various liquids to tough solids. The viscous liquids of relatively low molecular weight are useful in the preparation of polishes and waxes and as thickening agents for various lubricants. The polymers can also be employed as protective coatings and are useful for the production of various shaped articles such as brush handles, buttons, and the like. Moreover, since many of the compositions of this invention contain desirable functional groups, they are particularly useful in those areas where it is desirable to build such groups into the polymeric network.

Illustrative cyclic monomers which can polymerize with the oxetanes of this invention include, among others, the epoxides, such as 4-vinylcyclohexene dioxide, 3,4-epoxycyclohexyl, 3,4-epoxycyclohexylcarboxylate, bis(2,3-epoxycyclopentyl)-ether, and the like. Polymerization can be effected in the presence of known epoxide polymerization catalysts according to accepted techniques.

Although the invention has been illustrated by the preceding examples, it is not to be construed as being limited to the materials employed therein, but rather, the invention encompasses the generic area as hereinbefore disclosed. Various modifications and embodiments of this invention can be made without departing from the spirit and scope thereof.

What is claimed is:

1. The oxetane of the formula:

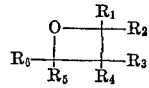

wherein $R_1$–$R_4$ are selected from the group consisting of hydrogen, lower alkyl and haloloweralkyl, $R_5$ is selected from the group consisting of lower alkyl, phenyl and haloloweralkylphenyl, and $R_6$ is selected from the group consisting of pyridyl, N-loweralkyl-1,2,5,6-tetrahydropyridyl and N-monocarbocyclicaryl-1,2,5,6-tetrahydropyridyl.

2. 2-phenyl-4-chloromethyloxetane.

3. The oxetane of the formula:

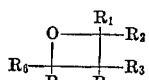

wherein $R_1$–$R_4$ are hydrogen, $R_5$ is phenyl and $R_6$ is pyridyl.

4. The oxetane of claim 3 wherein $R_6$ is orthopyridyl.
5. The oxetane of claim 3 wherein $R_6$ is metapyridyl.
6. The oxetane of claim 3 wherein $R_6$ is parapyridyl.

7. The oxetane of the formula:

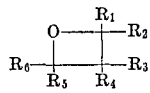

wherein $R_1$–$R_4$ are hydrogen, $R_5$ is methyl and $R_6$ is metapyridyl.

8. The oxetane of the formula:

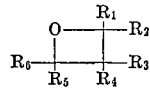

wherein $R_1$–$R_4$ are hydrogen, $R_5$ is methyl and $R_6$ is parapyridyl.

9. The oxetane of the formula:

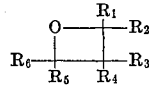

wherein $R_1$–$R_4$ are hydrogen, $R_5$ is phenyl and $R_6$ is N-loweralkyl-1,2,5,6-tetrahydropyridyl.

10. The oxetane of the formula:

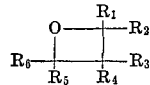

wherein $R_1$–$R_4$ are hydrogen, $R_5$ is phenyl and $R_6$ is N-monocarbocyclicaryl-1,2,5,6-tetrahydropyridyl.

11. The oxetane of the formula:

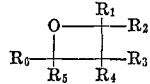

wherein $R_1$–$R_4$ are hydrogen, $R_5$ is phenyl and $R_6$ is N-monocarbocyclicarylloweralkyl-1,2,5,6-tetrahydropyridyl.

12. The oxetane of the formula:

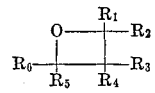

wherein $R_1$–$R_4$ are hydrogen, and $R_5$ and $R_6$ together with the carbon atom to which they are attached represent a member selected from the group consisting of:

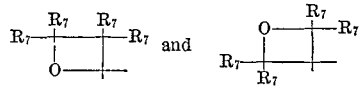

wherein $R_7$ is a member selected from the group consisting of hydrogen, halogen, phenyl and loweralkyl.

13. The oxetane of the formula:

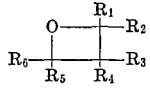

wherein $R_1$–$R_4$ are hydrogen, $R_5$ is phenyl and $R_6$ is haloloweralkyl.

References Cited

UNITED STATES PATENTS 3,146,180   8/1964   Cenci _____ 204—162

HENRY R. JILES, *Primary Examiner.*

A. L. ROTMAN, *Assistant Examiner.*

U.S. Cl. X.R.

260—294.7, 294, 295, 296, 268, 251, 310, 247.2, 247.7, 333, 327; 204—162; 167—33